United States Patent [19]
Charmot et al.

[11] Patent Number: 5,194,539
[45] Date of Patent: Mar. 16, 1993

[54] ORGANOSULFUR CHAIN TRANSFER AGENTS FOR EMULSION COPOLYMERIZATION

[75] Inventors: Dominique Charmot, Paris; Nicole Oger, Nanterre, both of France

[73] Assignee: Rhone-Poulenc Chimie, Courbevoie, France

[21] Appl. No.: 738,919

[22] Filed: Aug. 1, 1991

[30] Foreign Application Priority Data

Aug. 1, 1990 [FR] France ................... 90 09816

[51] Int. Cl.$^5$ ................................... C08F 2/38
[52] U.S. Cl. ........................ 526/220; 526/223; 524/812; 524/831; 524/832; 524/836
[58] Field of Search ............ 526/220, 223; 524/812, 524/831, 832, 836

[56] References Cited
U.S. PATENT DOCUMENTS
3,629,373 12/1971 Embree .................. 525/192

FOREIGN PATENT DOCUMENTS
336824 10/1989 European Pat. Off. .
827320 2/1960 United Kingdom .

OTHER PUBLICATIONS
Chem. Abstr. 112(4):22169v (1989) "Process for Preparing Polychloroprene".
R. T. Morrison and R. N. Boyd, "Organic Chemistry," 3rd Ed, Allyn & Bacon, Boston (1973) p. 318.

*Primary Examiner*—Joseph L. Schofer
*Assistant Examiner*—M. Nagumo
*Attorney, Agent, or Firm*—Burns, Doane, Swecker & Mathis

[57] ABSTRACT

Odorless, aqueous copolymer dispersions are produced by emulsion copolymerizing a comonomer recipe which comprises at least 60% by weight of styrene and/or butadiene and/or an acrylic ester and/or a vinyl nitrile, and, optionally, up to 40% by weight of at least one other copolymerizable comonomer, in an aqueous medium of copolymerization, in the presence of an alkoxy, aryloxy, acyloxy or acylamino substituted diphenyl disulfide chain transfer agent.

10 Claims, No Drawings

ORGANOSULFUR CHAIN TRANSFER AGENTS FOR EMULSION COPOLYMERIZATION

BACKGROUND OF THE INVENTION

1. Field of the Invention

The present invention relates to the preparation of aqueous dispersions of copolymers by emulsion polymerization of ethylenically unsaturated monomers in the presence of an organosulfur chain transfer agent.

2. Description of the Prior Art

Aqueous dispersions of copolymers and terpolymers such as the styrene/butadiene, styrene/acrylates, styrene/acrylonitrile and acrylonitrile/butadiene/styrene latexes are widely used for various applications, including coating compositions and adhesive and impregnating compositions.

In order to limit the molecular weight and/or the degree of crosslinking of the resulting copolymer, which have profound effects on the ultimate uses of the latexes, it is usual to employ a chain transfer agent which functions during the polymerization process. The transfer agents typically employed industrially comprise aliphatic mercaptans and halogenated hydrocarbons. These two types of regulators present certain disadvantages, e.g., dispersions produced in the presence of a mercaptan, although having a very low residual mercaptan content, have an undesirable characteristic odor. If halogenated organic compounds, such as carbon tetrachloride, bromoform or bromotrichloromethane, are used, the residual contents thereof are relatively high. The odor associated with the mercaptans, or the presence of residual halogenated compounds, constitutes a serious limitation on the use of the dispersions for certain applications, for example as binders in adhesive or coating formulations, and, in particular, in formulations adopted for the coating of paper. These disadvantages may be eliminated either by treatment of the latex with an agent which converts the thiol to an odorless product (see, for example, U.S. Pat. No. 3,756,976) or by a devolatilization in the case of the halogenated organic compounds. However, these processes are expensive and difficult to carry out.

Other organic disulfides belonging to such families as diaryl disulfides, alkylthiuram disulfides and xanthogen disulfides are generally known as agents which regulate the molecular weight during the polymerization of unsaturated monomers including styrene and butadiene.

However, the particular compounds, diphenyl disulfide, tetramethylthiuram disulfide and diethylxanthogen disulfide, all present disadvantages. Diphenyl disulfide is insufficiently effective, the thiuram exhibits a retarding or even an inhibiting action on the polymerization and the xanthogens have a pronounced odor.

Diphenyl disulfides substituted by amino radicals have also been described as transfer agents for the polymerization and the copolymerization of styrene (FR-A-2,321,519); these species still present the disadvantage of being polymerization retardants.

SUMMARY OF THE INVENTION

Accordingly, a major object of the present invention is the provision of an improved polymerization process entailing a good conversion of the monomers, to produce copolymer latexes which have little or no objectionable odor and no residual halogenated compounds without requiring any post-polymerization treatment or removal of residual transfer agent.

Briefly, the present invention features a process for the production of aqueous dispersions of copolymers, comprising polymerizing a mixture of monomers containing at least 60% by weight of styrene and/or butadiene and/or acrylic ester and/or vinyl nitrile, optionally with up to 40% by weight of one or more other unsaturated monomers copolymerizable therewith, in aqueous emulsion and in the presence of a chain transfer agent comprising a substituted diphenyl disulfide of the formula (I):

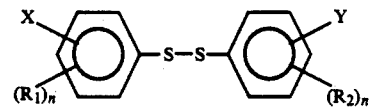

in which X and Y are each, independently, a radical $-ZR_3$ where Z is $-O-$,

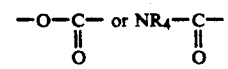

and $R_3$ is a straight or branched chain alkyl radical or an aryl, aralkyl or cycloaliphatic radical, $R_1$ and $R_2$, which may be identical or different, are each a straight or branched chain $C_1$-$C_{12}$ alkyl radical, $R_4$ is a hydrogen atom or a $C_1$-$C_4$ alkyl radical and D is an integer ranging from 0 to 4.

DETAILED DESCRIPTION OF THE PREFERRED EMBODIMENTS OF THE INVENTION

More particularly according to the present invention, the radicals represented by $R_3$ in formula (I) are advantageously alkyl radicals having from 1 to 12 carbon atoms, preferably from 1 to 6 carbon atoms, or $C_6$-$C_{16}$ aryl, aralkyl or cycloaliphatic radicals which may be substituted by one or more straight or branched chain alkyl or alkoxy radicals having from 1 to 4 carbon atoms, such as phenyl, benzyl, benzyhydryl, naphthyl, phenethyl, phenylpropyl, methoxyphenyl, ethoxyphenyl, butoxyphenyl and cyclohexyl radicals.

The substituents represented by X and Y are advantageously, for example, methoxy, ethoxy, isopropoxy, hexyloxy, phenoxy, benzyloxy, naphthyloxy, acetoxy, propionyloxy, benzoyloxy, naphthoyloxy, acetamido, propanamido, pentanamido, heptanamido, dodecanamido, benzamido, benzeneacetamido, benzenepropanamido, methylacetamido, dimethylacetamido or methoxybenzamido radicals.

It is desirable that the substituents X and Y be in the ortho- or para-positions on the aromatic ring.

Particularly exemplary compounds of formula (I) include bis(alkoxyphenyl) disulfides and bis(aryloxyphenyl) disulfides, such as bis(methoxyphenyl) disulfides, for example bis(2-methoxyphenyl) disulfide, bis(3-methoxyphenyl) disulfide and bis(4-methoxyphenyl) disulfide; bis(ethoxyphenyl) disulfides; bis(isopropoxyphenyl) disulfides; bis(hexyloxyphenyl) disulfides; bis(phenoxyphenyl) disulfides; bis(benzyloxyphenyl) disulfides and bis(naphthyloxyphenyl) disulfides; bis(acyloxyphenyl) disulfides such as bis(acetoxyphenyl) disulfides; bis(propionyloxyphenyl) disulfides; bis(benzoyloxyphenyl) disulfides and bis(naphthoxyoxyphenyl) disulfides; bis(acylaminophenyl) disulfides, such as bis(2-acetamidophenyl) disulfide and bis(4-acetamidophenyl) disulfide, bis(2,5-dimethyl-4-acetamidophenyl) disulfide, bis(3-methyl-4-acetamidophenyl) disulfide, bis(4-propanamidophenyl) disulfide, bis(4-hexanamidophenyl) disulfide, bis(4-dodecamidophenyl) disulfide, bis(4-isobutyramidophenyl) disulfide, bis(2-benzamidophenyl) disulfide, bis(4-benzamidophenyl) disulfide, bis(2-benzene-acetamidophenyl) disulfide, bis(4-benzeneacetamidophenyl) disulfide, bis(4-benzenepropanamidophenyl) disulfide and bis(2-benzamido-4-methoxyphenyl) disulfide.

It will of course be appreciated that it is possible to use a mixture of disulfides of formula (I). These disulfides are available commercially or may be prepared by any known technique, for example by oxidative coupling of the corresponding substituted monothiol, by sulfuration of the substituted phenyl or by acylation, esterification or etherification of the corresponding di(aminophenyl) disulfide or di(hydroxyphenyl) disulfide.

The polymerizable monomers include at least 60% by weight of two or more comonomers selected from among styrene, butadiene, acrylic esters and vinyl nitriles. By the term "acrylic esters" are intended esters of acrylic acid and of methacrylic acid with $C_1$-$C_{12}$, preferably $C_1$-$C_8$, alkanols, such as methyl acrylate, ethyl acrylate, propyl acrylate, n-butyl acrylate, isobutyl acrylate, 2-ethylhexyl acrylate, methyl methacrylate, ethyl methacrylate, n-butyl methacrylate, isobutyl methacrylate, etc. The vinyl nitriles include those having from 3 to 12 carbon atoms, in particular acrylonitrile and methacrylonitrile.

All or a portion of the styrene may be replaced by α-methylstyrene or vinyltoluene.

The following are particularly exemplary ethylenically unsaturated comonomers which are copolymerizable with the above monomers and the amount of which may range up to 40% by weight of the total amount of comonomers:

(1) Carboxylic acid vinyl esters, such as vinyl acetate, vinyl versatate and vinyl propionate;

(2) Ethylenically unsaturated monocarboxylic and dicarboxylic acids, such as acrylic acid, methacrylic acid, itaconic acid, maleic acid and fumaric acid, and the monoalkyl esters of dicarboxylic acids of the type indicated with alkanols preferably having 1 to 4 carbon atoms and the N-substituted derivatives thereof;

(3) Unsaturated carboxylic acid amides, such as acrylamide, methacrylamide, N-methylolacrylamide or N-methacrylamide;

(4) Ethylenically unsaturated monomers containing a sulfonic acid group and its alkali metal or ammonium salts, for example vinylsulfonic acid, vinylbenzenesulfonic acid, α-acrylamidomethylpropanesulfonic acid and 2-sulfoethylene methacrylate;

(5) Ethylenically unsaturated monomers containing a secondary, tertiary or quaternary amino group or a heterocylic group containing nitrogen, for example vinylpyridines, vinylimidazole, aminoalkyl (meth)acrylates and aminoalkyl (meth)acrylamides, such as dimethylaminoethyl acrylate or methacrylate, di-tert-butylaminoethyl acrylate or methacrylate, dimethylaminomethylacrylamide or dimethylaminomethylmethacrylamide, etc., as well as zwitterionic monomers such as sulfopropyl acrylate, (dimethyl)aminopropyl acrylate, etc., and (6) Esters of (meth)acrylic acids with alkanediols preferably having 2-8 carbon atoms, such as glycol mono(meth)acrylate, hydroxypropyl mono(meth)acrylate, butane-1,4-diol mono(meth)acrylate and also the comonomers containing two polymerizable double bonds, such as ethylene glycol dimethacrylate.

In addition to the monomers indicated above, ethylenically unsaturated and crosslinkable monomers such as glycidyl (meth)acrylate or vinyl and acrylic silanes, may also be used, in minor amounts, generally ranging from 0.1% to 5%.

Representative compositions for the production of binder latexes include compositions containing, by weight, 25% to 90%, preferably 45% to 75%, of styrene and/or acrylonitrile, 75% to 10%, preferably 55% to 25%, of butadiene and/or acrylates, 0% to 20%, preferably 1% to 10%, of unsaturated carboxylic acid and 0% to 40%, preferably 0% to 15%, of other ethylenically unsaturated monomers.

The polymerization is carried out in known manner, in an aqueous emulsion of the polymerizable monomers in the presence of at least one free radical initiator and the transfer agent, with a monomer concentration in the reaction mixture typically ranging from 20% to 60% by weight.

Any type of free radical initiator suitable for emulsion polymerization may be used. Exemplary initiators include hydroperoxides, such as hydrogen peroxide or diisopropylbenzene hydroperoxide, sodium, potassium or ammonium persulfates and cationic initiators such as azo-bis(isobutyronitrile) or 4,4'-azo-bis(4-cyanovaleric acid).

These initiators may be combined with a reducing agent such as, for example, bisulfite. The amount generally ranges from 0.05% to 2% by weight relative to the amount of monomers.

The amount of substituted diphenyl disulfide advantageously ranges from 0.1% to 10%, preferably from 0.5% to 5% by weight relative to the total weight of the monomers, according to the molecular weight and the degree of crosslinking desired for the polymer. It may be introduced into the reaction mixture either in a single amount at the beginning of the reaction, or continuously in solution in the principal monomers, or a portion may be introduced initially and a portion continuously. If the solubility of the product in the monomers is low, it may be introduced in the form of a suspension at the same time as the monomers.

The simultaneous use of a known transfer agent such as, for example, a mercaptan, with the diphenyl disulfide according to the invention is possible to the extent that it does not impart an undesirable odor.

The polymerization temperature, which depends on the initiator used, typically ranges from 50° C. to 100° C., preferably from 70° C. to 90° C. The stabilization of the particles is assured, if necessary, by any known colloidal stabilization system, such as anionic, cationic, amphoteric and nonionic emulsifiers.

Exemplary anionic emulsifiers include alkali metal alkylsulfates, alkali metal alkylsulfonates, alkali metal alkylarylsulfonates and alkali metal alkylphosphates; dialkyl sulfosuccinates; and sodium, potassium or ammonium salts of saturated or unsaturated fatty acids. Exemplary cationic emulsifiers include alkylpyridinium or alkylammonium salts, such as N-ethyldodecylammonium chloride or bromide, or cetylammonium chloride or bromide. And exemplary nonionic emulsifiers include the polyoxyethylenated and/or polyoxypropylenated derivatives of fatty alcohols, fatty acids or alkylphenols.

The polymerization may be carried out continuously, noncontinuously or semi-continuously with introduction of a fraction of the monomers continuously and also may be of the "seeded" or "incremental" type according to known technique for producing particles of homogeneous and heterogeneous structure.

The odorless aqueous dispersions of copolymers and the copolymers comprising same may be recovered by any known means. Such copolymers contain phenyl sulfide groups substituted by a radical -ZR$_3$ as defined in formula (I).

The aqueous dispersions may advantageously be used as binders in coating compositions for coating paper.

They are also useful as binders in the textile industry, in particular for the production of nonwovens, and as an additive in paints and adhesive formulations.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

Preparation of the Transfer Agent

Bis(2-acetamidophenyl) disulfide was synthesized by the method described in FR-A-1,061,103, by acylation of 2-amino-thiophenol by acetic anhydride at a temperature ranging from 0° C. to 5° C. followed by oxidation, in air, of the product obtained dissolved in a molar solution of sodium carbonate.

Melting point: 156° C.

Polymerization

The following materials were charged into a polymerization reactor:

|  | Parts |
| --- | --- |
| Butadiene | 3.8 |
| Styrene | 6.2 |
| Itaconic acid | 1 |
| Sodium dodecylphenyloxybenzene disulfonate (DOWFAX 2A1 ®)) | 0.3 |
| Ammonium persulfate | 0.5 |
| Sodium lauryl sulfate | 0.5 |
| Water | 60 |

The mixture was heated to 75° C. under a nitrogen atmosphere and the following materials were introduced continuously over the course of 10 hours:

|  | Parts |
| --- | --- |
| Butadiene | 34.7 |
| Styrene | 55.3 |
| Acrylic acid | 1 |
| Sodium dodecylphenyloxybenzene disulfonate (DOWFAX 2A1 ®)) | 1.7 |
| Ammonium persulfate | 0.5 |
| Bis(2-acetamidophenyl) disulfide | 2 |
| Water | 37 |

Upon completion of the addition, the temperature was increased to 80° C. for a period of 30 minutes and the mixture was then allowed to cool to ambient temperature.

EXAMPLES 2 to 4

The transfer agent used was bis(2-benzamidophenyl) disulfide. It was prepared by acylation of 2-aminothiophenol using benzoyl chloride at 10° C. in the presence of sodium hydroxide, followed by oxidation by a stream of air and recrystallization from alcohol.

Melting point: 139° –140° C.

The polymerization was carried out according to the procedure of Example 1, except that one part of the disulfide was introduced initially and the remaining portion was introduced continuously over the course of 10 hours of heating, in the following amounts:

|  | Example | | |
| --- | --- | --- | --- |
|  | 2 | 3 | 4 |
| Parts by weight |  |  |  |
| initially | 1 | 1 | 1 |
| continuously | 2 | 1 | 3 |

EXAMPLE 5

A polymerization was carried out according to the procedure of Example 1, using 2 parts of bis(3-tert-butyl-2-methoxy-5-methylphenyl)disulfide. The disulfide was synthesized by methylation of 2-tert-butylparacresol at 120° C. in an alkaline aqueous-methanolic solution using methyl chloride, followed by sulfuration, in a toluene medium, of the 2-tert-butylparacresol methyl ether by sulfur monochloride in stoichiometric excess. The product obtained was recrystallized from methanol.

EXAMPLE 6

The following materials were charged into a polymerization reactor:

|  | Parts |
| --- | --- |
| Butadiene | 2.7 |
| Styrene | 7.3 |
| Itaconic acid | 1 |
| Sodium dodecylphenyloxybenzene disulfonate (DOWFAX2A1 ®)) | 0.3 |
| Ammonium persulfate | 0.5 |
| Sodium lauryl sulfate | 0.5 |
| Bis(2-benzamidophenyl) disulfate | 1.5 |
| Water | 60 |

The mixture was heated to 75° C. under a nitrogen atmosphere and the following materials were introduced continuously over the course of 10 hours:

|  | Parts |
| --- | --- |
| Butadiene | 24.3 |
| Styrene | 65.7 |
| Acrylic acid | 1 |
| Sodium dodecylphenyloxybenzene disulfonate (DOWFAX2A1 ®)) | 1.7 |
| Ammonium persulfate | 0.5 |
| Bis(2-benzamidophenyl) disulfide | 2 |
| Water | 37 |

The reaction mixture was then adjusted to 80° C. for 30 minutes and was then allowed to cool to ambient temperature.

EXAMPLE 7

A polymerization was conducted according to the procedure of Example 1 using the following compositions:

|  | Parts |
| --- | --- |
| Initial mixture |  |
| Butadiene | 3.7 |
| Styrene | 5 |
| Acrylonitrile | 1.3 |
| Itaconic acid | 1 |
| Sodium dodecylphenyloxybenzene disulfonate (DOWFAX2A1 ®) | 0.3 |
| Ammonium persulfate | 0.5 |
| Sodium lauryl sulfate | 0.5 |
| Bis(2-benzamidophenyl) disulfide | 1.5 |
| Water | 60 |
| Mixture added continuously: |  |
| Butadiene | 33.3 |
| Styrene | 45 |
| Acrylonitrile | 11.7 |
| Acrylic acid | 1 |
| Sodium dodecylphenyloxybenzene disulfonate (DOWFAX2A1 ®) | 1.7 |
| Ammonium persulfate | 0.5 |
| Bis(benzamidophenyl) disulfide | 2 |
| Water | 37 |

EXAMPLE 8

A polymerization was carried out according to the procedure of Example 7, but replacing the acrylonitrile with the same amount of methyl methacrylate.

EXAMPLE 9 (COMPARATIVE EXAMPLE)

The polymerization described in Example 6 was repeated, but replacing the bis(2-benzamidophenyl) disulfide with tert-dodecyl mercaptan (0.4 parts initially and then 0.4 parts continuously into the mixture).

EXAMPLES 10 to 12 (COMPARATIVE EXAMPLES)

Polymerizations were carried out according to the procedure of Example 1, but replacing the bis-(acetamido phenyl) disulfide with the following modifying agents:

|  |  | Parts | |
| --- | --- | --- | --- |
| Example | Modifier | initially | continuously |
| 10 | t-dodecyl mercaptan | 0.5 | 0.4 |
| 11 | carbon tetrachloride | 3.25 | 0 |
| 12 | di(aminophenyl) disulfide | 0 | 1.5 |

The following Table reports, for each example, the proportion of copolymer insoluble in chloroform and the proportion of residual monomers in the latex.

The proportion of residual monomers in the latex was measured by steam distillation and collection in the Dean and Stark apparatus. It is expressed in % by weight relative to the weight of the emulsion.

The proportion of copolymer insoluble in chloroform was determined by the following method:

Using the latex to be examined, a film 15/100 mm thick was prepared on a glass plate. A sample of the dry film weighing Wo was extracted by chloroform heated to reflux using a Soxhlet apparatus, then dried and weighed. The proportion of copolymer is given by the ratio W (weight of the sample after drying)/Wo, expressed as a percentage.

Using the latex obtained according to Examples 1 to 12 as the starting materials, aqueous compositions for coating paper were prepared which had the following composition:

| Kaolin SPS | 100 parts |
| --- | --- |
| Sodium hexametaphosphate | 0.3 part |
| Carboxymethylcellulose (low viscosity) | 0.3 part |
| Latex | 10 parts |

Each composition was adjusted to a pH of 8.5 by adding sodium hydroxide and to a solids content of 50% by weight by adding water.

A paper of the offset type was provided with a 15 g/m² coating of each of the compositions using an air knife coater. The coated paper was dried, then calendered under standard conditions and conditioned at 23° C. in an atmosphere of 50% relative humidity.

The properties of the coated paper were determined.

Whiteness: in accordance with TAPPI standard T-452 om 87 using a ELREPHO 2000 ® apparatus.

Resistance to dry and moist stripping: in accordance with TAPPI standard T-499 using the IGT AIC2 apparatus. For determination of the resistance to moist stripping, the test strip was moistened before printing; a "3801" ink marketed by LORILLEUX and a speed of 1 m/sec were used. A "3804" ink was used for the determination of the resistance to dry stripping.

Porosity to the ink (suitability for printing): in accordance with TAPPI standard MC-19 using a K&N ink. The ink was placed on the coated paper and the excess was then wiped after 2 minutes. The whiteness was measured before inking and after inking.

The result is reported in % loss of whiteness.

Odor: the coated papers were treated in an oven at 70° C. for 2 hours and stored in 10 closed 1-liter wide-mouthed vessels. The total odor of the vessel after breathing in 2 to 3 times was noted by a jury of 10 individuals, using a scale ranging from 0 to 4:

0:no perceptible odor
  1:barely perceptible odor
  2:weak odor
  3:clear, very distinct odor
  4:strong odor The result was the average of the ratings.

The characteristics of the coated paper are reported in the following Table:

TABLE

|  | Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Emulsions |  |  |  |  |  |  |  |  |  |  |  |  |
| % insoluble in CHCl₃ | 70 | 79 | 85 | 74 | 80 | 77 | 80 | 77 | 76 | 75 | 71 | 30 |
| % residual monomers | 0.1 | 0.5 | 0.2 | 0.3 | 0.4 | 0.2 | 0.1 | 0.3 | 0.5 | 0.3 | 0.2 | 18 |
| Coated paper |  |  |  |  |  |  |  |  |  |  |  |  |
| Whiteness (%) | 84.2 | 84 | 83.9 | 83.8 | 84.1 | 84.3 | 84.5 | 84.3 | 84.2 | 85 | 84.2 | 84.1 |

TABLE-continued

|  | Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Dry stripping (cm/s) | 76 | 81 | 65 | 78 | 78 | 42 | 71 | 72 | 46 | 79 | 77 | 33 |
| Moist stripping (/10) | 9 | 9 | 8 | 9 | 9 | 7 | 9 | 9 | 7 | 9 | 9 | 9 |
| Porosity (%) | 13 | 12 | 12 | 11 | 12 | 18 | 16 | 15 | 17 | 12 | 11 | 12 |
| Odor | 1.1 | 1.3 | 1.5 | 1.6 | 1 | 1.3 | 1.2 | 1.1 | 2.8 | 2.5 | 0.9 | 2.2 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of an aqueous copolymer dispersion, comprising an emulsion copolymerizing comonomer mixture which comprises at least 60% by weight of a styrene and/or a butadiene and/or an acrylic ester and/or a vinyl nitrile in an aqueous medium of copolymerization, in the presence of a substituted diphenyl disulfide chain transfer agent having the formula (I):

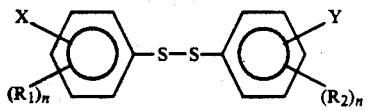

in which X and Y, independently, are each a group -$ZR_3$ wherein Z is —O—,

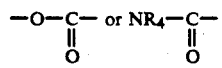

and $R_3$ is a straight or branched chain alkyl radical or an aryl, aralkyl or cycloaliphatic radical, $R_1$ and $R_2$, which may be identical or different, are each a straight or branched chain $C_1$-$C_{12}$ alkyl radical, $R_4$ is a hydrogen atom or a $C_1$-$C_4$ alkyl radical and n is an integer ranging from 0 to 4, wherein said dispersion is free from xanthogen disulfide chain transfer agents.

2. The process as defined by claim 1, said comonomer mixture comprising up to 40% by weight of at least one other copolymerizable comonomer.

3. The process as defined by claim 2, said copolymer mixture comprising 25% to 90% of styrene and/or acrylonitrile, 10% to 75% of butadiene and/or acrylic esters, 0% to 20% of unsaturated carboxylic acid and 0% to 40% of other ethylenically unsaturated comonomers.

4. The process as defined by claim 1, wherein formula (I), $R_3$ is a $C_1$-$C_{12}$ alkyl radical.

5. The process as defined by claim 4, wherein formula (I), $R_3$ is a $C_1$-$C_6$ alkyl radical.

6. The process as defined by claim 1, wherein formula (I), $R_3$ is a $C_6$-$C_{16}$ aryl, aralkyl or cycloaliphatic radical, or a substituted such radical bearing at least one straight or branched chain alkyl or alkoxy substituent having from 1 to 4 carbon atoms.

7. The process as defined by claim 1, carried out in the presence of from 0.1% to 10% by weight of said substituted diphenyl disulfide relative to the total weight of the copolymerizable comonomers.

8. The process as defined by claim 1, said substituted diphenyl disulfide chain transfer agent of formula (I) comprising a bis(alkoxyphenyl) disulfide, a bis(aryloxyphenyl) disulfide, a bis(acyloxyphenyl) disulfide, or a bis(acylaminophenyl) disulfide.

9. The process as defined by claim 1, wherein said disulfide chain transfer agent is bis (2-acetamidophenyl) disulfide.

10. The process as defined by claim 1, wherein said disulfide chain transfer agent is bis (2-benzamidophenyl) disulfide.

* * * * *